United States Patent [19]

Moribe et al.

[11] Patent Number: 4,639,804
[45] Date of Patent: Jan. 27, 1987

[54] HEAD LOADING SYSTEM

[75] Inventors: Yoshihiro Moribe, Chigasaki; Yukitaka Hayashi, Odawara; Hideo Maekawa, Yokohama; Kunitsugu Tsukui, Chigasaki, all of Japan

[73] Assignee: Hitachi, Ltd., Tokyo, Japan

[21] Appl. No.: 475,592

[22] Filed: Mar. 15, 1983

[30] Foreign Application Priority Data

Mar. 19, 1982 [JP] Japan ................................. 57-42745

[51] Int. Cl.[4] ............................................. G11B 5/54
[52] U.S. Cl. .................................................. 360/105
[58] Field of Search ........................ 360/105; 74/99 A

[56] References Cited

U.S. PATENT DOCUMENTS 4,209,813 6/1980 Bryer .................................... 360/105
4,241,366 12/1980 Nishida ............................... 360/105

FOREIGN PATENT DOCUMENTS

| 675701 | 12/1963 | Canada | 74/99 A |
| 49943 | 4/1982 | European Pat. Off. | 360/105 |
| 3022734 | 3/1983 | Fed. Rep. of Germany . | |
| 916436 | of 0000 | United Kingdom . | |
| 1237016 | 2/1969 | United Kingdom . | |
| 1415167 | 11/1972 | United Kingdom . | |
| 2010566 | 10/1978 | United Kingdom . | |

Primary Examiner—A. J. Heinz
Attorney, Agent, or Firm—Antonelli, Terry & Wands

[57] ABSTRACT

A head loading system including a head support mechanism supporting heads for at least reproducing information in juxtaposed relation to a recording medium, and a loading actuator driving the head support mechanism to move the heads toward and away from the recording medium. The loading actuator include motion converting arrangement for converting a linear motion of a solenoid into a rotary motion which is capable of increasing the amount of motion when the linear motion is converted into the rotary motion, thereby enabling the loading actuator to drive the heads with a small amount of linear motion. The motion converting arrangement includes a rotary member connected to a plunger of the solenoid and formed with grooves, a frame juxtaposed against the rotary member and formed with grooves and a bearing fitted between the grooves. The linear motion of the plunger is converted into a rotary motion of the rotary member by the action of the bearing performed in cooperation with the grooves.

11 Claims, 25 Drawing Figures

HEAD LOADING SYSTEM

BACKGROUND OF THE INVENTION

This invention relates to head loading systems, and more particularly, to a head loading system of a magnetic disc apparatus or flexible disc apparatus, capable of moving toward and away from an information recording medium at least one magnetic head for at least reproducing information recorded on such information recording medium.

Generally a magnetic disc apparatus or flexible disc apparatus comprises a head loading system for moving at least one magnetic head serving as an information reproducing head toward and away from a magnetic disc functioning as a recording medium for recording information therein. The head loading system comprises a magnetic head support mechanism for supporting the magnetic head in juxtaposed relation to one surface of the magnetic disc, and a head loading actuator for driving the magnetic head support mechanism to move the magnetic head toward and away from the surface of the magnetic disc. A magnetic head support mechanism of a magnetic head loading system of the prior art will be described by referring to FIGS. 1(a) to 2(b).

The magnetic head support mechanism of the head loading system shown in FIGS. 1(a) and 1(b) comprises a gimbaled spring 4 for resiliently supporting a magnetic head 1a jaxtaposed against a top surface of a magnetic disc 6, a swing arm 3a for supporting the gimbaled spring 4 for vertical movement and supporting a hook 5 at one end portion and a downwardly projecting cam 7a at the other end portion, a swing arm 3b mounting at one end portion a magnetic head 1b in juxtaposed relation to a bottom surface of the magnetic disc 6 and having at the other end portion an upwardly extending cam 7b which is brought into engagement with the cam 7a, a support portion 50 for supporting the swing arms 3a and 3b through support springs 2, respectively, and preloading springs 8a and 8b extending from the support portion 50 to urge the swing arms 3a and 3b respectively to move in a direction in which they are closed. The numeral 9 designates a bail for moving the hook 5 vertically which constitute a part of the magnetic head loading actuator subsequently to be described.

When the magnetic heads 1a and 1b are respectively located close to the top and bottom surfaces of the magnetic disc 6, the magnetic head support mechanism is located such that, as shown in FIGS. 1(a) and 1(b), the bail 9 has its forward end 9a spaced apart from the hook 5 because it is located in a lower position. As the swing arms 3a and 3b are pressed by the preloading springs 8a and 8b respectively, the magnetic heads 1a and 1b are moved to positions in which they are close to the top and bottom surfaces of the magnetic disc 6 respectively. In the head loading system of the aforesaid construction, the head loading actuator is operative to cause the forward end 9a of the bail 9 to lift the hook 5 to thereby cause the magnetic head 1a supported by the swing arm 3a through the gimbaled spring 4 to move away from the top surface of the magnetic disc 6, as shown in FIGS. 2(a) and 2(b). As the cam 7a moves leftwardly to press the cam 7b of the arm 3b to move it leftwardly in the figure in the process of the movement of the swing arm 3a in the clockwise direction, the swing arm 3b moves in the counterclockwise direction to move the magnetic head 1b supported by the arm 3b away from the magnetic disc 6.

Upward movement of the bail 9 causes the parts in positions shown in FIG. 1(a) to shift to positions shown in FIG. 2(a). The operation characteristic of the bail 9 is very important because it would exert influences on (1) the speed of response of the head loading system to an external signal and (2) the damage which the magnetic disc and the magnetic heads might suffer when the latter strike the former. Particularly in recent years, the head loading actuator of a head loading system is required to have the following functions:

(1) To respond quickly to an external signal and move the magnetic heads near to or into intimate contact with the magnetic disc in a very short period of time;

(2) To avoid damage which the magnetic disc might suffer when the magnetic heads strike same by causing the latter to come into contact with the former gently; and (3) To perform the aforesaid operations with minimized energy. To cope with this situation, head loading systems of the prior art use a head loading actuator shown in FIG. 3. The head loading actuator shown in the figure comprises a push-pull solenoid 12 including a plunger 13, a coil 14 and a fixed pole 16, the bail 9 having one end adapted to come into engagement with the hook 5, and a return spring 11. The bail 9 has a central portion pivotally connected to the plunger 13 of the solenoid 12 and is adapted to come into engagement at the forward end 9a with the hook 5 while it is pullsed at its rear end by the return spring 11 to be pivoted at a pin 10. As an energizing current is passed to the coil 14, the solenoid 12 is energized and pulls the plunger 13 downwardly against the biasing force of the return spring. This causes the bail 9, pivotally connected to the plunger 13, to move in the clockwise direction about the pin 10 to move downwardly the hook 5 in engagement with the forward end 9a of the bail 9. Upon interruption of the supply of the energizing current to the coil 14, the bail 9 is moved in the counterclockwise direction by the biasing force of the return spring 11 about the pin 10 to move the hook 5 upwardly in the figure. By these operations, the head loading actuator moves vertically up and down the hook 5 of the magnetic head support so as to thereby move the magnetic heads toward and away from the magnetic disc.

FIG. 4 shows the relation between the stroke and the attracting force of the solenoid 12 that can be established when the energizing current passed to the coil 14 is constant. In FIG. 4 the figure, it will be seen that in the process of movement of the forward end of the plunger 13 from an upper-most position (starting point 15a) of a stroke of 3 mm to a lowermost position (terminating point 15b) of a stroke of 0, the attracting force increases rapidly non-linearly from about 0.3 kg to 2.5 kg as indicated by an arrow C. The phenomenon that the attracting force increases with a reduction in stroke would be accounted for by the fact that, as the plunger 13 is attracted by the magnetic force and moves downwardly as shown in FIG. 3, the gap δ decreases and the magnetic flux density in the gap δ increases while the area spacing the plunger 13 away from the coil 12 increases.

FIG. 5 shows the stroke/load characteristic of the head loading system in which the stroke represents an overall resilience of the system including the biasing force of the return spring 11 of the head loading actuator and the biasing forces of the preloading springs 8a and 8b of the head support mechanism. As the stroke decreases from a condition (starting point 15c) in which the forward end 9a of the bail 9 is in engagement with the hook 5, the load increases little by little until a point D is reached at which the magnetic heads are brought into contact with the surfaces of the magnetic disc and the bail 9 is released from engagement with the hook 5 when the load decreases once, but thereafter the load increases little by little as balance is restored between the load and the force of restitution of the return spring 11 until a terminating point 15d is reached.

FIG. 6 shows the characteristic of FIG. 4 combined with the characteristic of FIG. 5. As shown in FIG. 6, it is necessary that an attracting force curve 100 of the solenoid 12 be higher at all times than a load curve 200 to allow the magnetic heads to move away from the magnetic disc, and the solenoid 12 would be inoperative if the attracting force is low as indicated by an attracting force curve 101.

Attention is directed to FIGS. 4-6 in which the attracting force shown is obtained by continuously passing an energizing current of a constant value to the coil 12. In actual practice, the attracting force would show variations in a transition state in passing an energizing current of a constant value to the coil of an actual apparatus. The variations occurring in the attracting force in the transient state are as follows:

(a) Assuming the magnetic field in the gap δ between the plunger 13 of the push-pull solenoid 12 and the fixed pole 16 is H(AT/m), and the magnetic flux density and the area thereof is B(WB/m³) and A(m²) respectively. Then, the attracting force F (kg) can be expressed by the following equation:

$$F = \frac{1}{9.8} \cdot H \cdot B \cdot A \tag{1}$$

Assuming the magnetic permeability is $\mu_o$, then the magnetic flux density B can be expressed by the following equation:

$$B = \mu_o \cdot H \tag{2}$$

Thus, equation (1) can be rewritten as equation (3) as follows:

$$F = \frac{1}{9.8} \cdot \mu_o \cdot A \cdot H^2 \tag{3}$$

Assuming the constant is determined by the construction of the solenoid 12, and number of turns of the coil 14 and the energizing current are K, N and I, respectively, then the magnetic field H can be expressed by the following equation:

$$H = K \cdot N \cdot I \tag{4}$$

From equations (3) and (4), the attracting force F can be expressed by the following equation:

$$F = \frac{1}{9.8} \cdot \mu_o \cdot A \cdot K^2 \cdot N^2 \cdot I^2 \tag{5}$$

Thus, when the constant determined by the construction of the solenoid 12 and the number of turns of the coil 14 is denoted by $A_o$, it will be seen that the attracting force of the plunger of the solenoid of the predetermined shape is proportional to the square of the energizing current I as shown by the following equation:

$$F = A_o \cdot I^2 \tag{6}$$

where $$A_o = \frac{1}{9.8} \cdot \mu_o \cdot K^2 \cdot N^2$$

(b) However, when the inductance and the internal resistance of the coil 14 are denoted by L and R, respectively, and a step voltage $E_o$ is impressed thereon, the energizing current will rise with an inclination of L/R with time and draw near $E_o/R$, as shown in the following equation and FIGS. 7(a) and 7(b):

$$I = \frac{E_o}{R} \left(1 - e^{-\frac{L}{R}t}\right)^2 \tag{7}$$

(c) Thus, as can be clearly seen in equations (6) and (7), a change with time of the attracting force in an actual apparatus has a characteristic such that the attracting force suddenly increases as indicated by an attracting force curve 110 shown in FIG. 8 as well as the following equation (8):

$$F = A_o \frac{E_o^2}{R^2} \left(1 - e^{-\frac{L}{R}t}\right)^2 \tag{8}$$

The stroke/attracting force characteristic shown in FIG. 8 indicates that since the attracting force 110 rises suddenly the plunger 13 has a very high acceleration when the stroke is 0. Because of this, there are great possibilities that the magnetic heads 1a and 1b would be forced, by the very high acceleration, to strike the magnetic disc 6 to cause damage to both the magnetic disc 6 and the magnetic heads 1a and 1b, since in an apparatus of the prior art, the hook 5 in engagement with the forward end 9a of the bail 9 would have its movement greatly accelerated. Moreover, the head loading system of the prior art has the problems in that a stopper 17 strikes a top surface of the solenoid 12 with a high force and produces a large noise, and that the solenoid 12 has a high consumption of electric power because it is necessary to place a string point 15e shown in FIG. 8 in a relatively high position. Additionally, the solenoid is located perpendicular to the planes of surfaces of the magnetic disc in the head loading system of the prior art, making it necessary for the apparatus to have, in addition to the vertical dimension of the solenoid, a vertical dimension that would enable the bail 9 and hook to move vertically upwardly away from the upper end of the solenoid. Thus, it has been impossible to reduce the vertical dimension of the head loading system, and consequently difficulties have been experienced in obtaining a magnetic disc apparatus of small thickness.

A head loading actuator similar to the one shown in FIG. 3 is disclosed in Japanese Patent Application Laid-Open No. 58311/76 corresponding to U.S. Ser. No. 510,471, now U.S. Pat. No. 3,973,274 for example.

In order to obviate the problems raised by the head loading actuator of the head loading system of the prior art of the aforesaid construction, attempts have been made by us to adopt the following measures:

(i) The head loading actuator would have a solenoid which would, as shown in FIG. 9, be constructed such that the plunger 13 would have a lower end projecting downwardly in the form of a cone and the fixed pole 16 would have a shape complementary with the aforesaid shape of the lower end of the plunger 13, to thereby reduce as much as possible a sudden change in the attracting force by minimizing a sudden change in the magnetic flux density and the opposed surfaces of the plunger 13 and the coil 14.

(ii) The head loading actuator would have a construction such that the point of connection between the bail 9 and the plunger 13 would be moved from the position shown in FIG. 3 to a position closer to the pin 10 serving as the pivot for the bail 9, to minimize the influences which might be exerted by a sudden change in the attracting force by decreasing the stroke of the plunger 13.

(iii) The head loading actuator would have a construction such that the push-pull solenoid 12 would have an electrical damping function or a hydraulic damping function.

However, it has been ascertained that some disadvantages are associated with various constructions of the head loading actuator described hereinabove. The solenoid construction described in paragraph (i) has proved, upon experiments, to have no marked improvement in operation characteristic. The head loading actuator described in paragraph (ii) could achieve no excellent effects because the compactness of the apparatus makes it impossible to increase the lever ratio $l_0/l_1$ (FIG. 3) of the bail 9. In the head loading actuator provided with a damper as described in paragraph (iii), the reliability of the apparatus as a whole would be lowered due to obturation of the damper and the short service life thereof, thereby making the apparatus of no practical value. Thus, it has been ascertained that no satisfactory operation characteristic can be obtained even if some improvements were provided in a head loading system of the prior art wherein the plunger and the bail are directly connected together.

SUMMARY OF THE INVENTION

This invention has been developed for the purpose of obviating the aforesaid disadvantages of the prior art. Accordingly an object of the invention is to provide a head loading system capable of moving the magnetic heads at high speed and yet bringing them into contact with a recording medium lightly with a soft tough.

Another object is to provide a head loading system capable of operating its head loading actuator with a minimum of consumption of electric power to thereby save energy.

A further object is to provide a head loading system enabling an information reproducing apparatus to have a small overall thickness.

According to the invention, there is provided a head loading system comprising a head support mechanism for supporting magnetic heads in juxtaposed relation to surfaces of a recording medium, and a head loading actuator for driving the head support mechanism, the head loading actuator comprising a solenoid including a plunger and located horizontally with respect to the surfaces of the recording medium, and motion converting means connected to the plunger capable of converting a linear motion of the plunger caused by the solenoid into a rotary motion and also capable of changing the motion conversion constant. The motion converting means of the head loading system according to the invention may comprise a motion converting portion connected to a shaft of the solenoid, rotary disc formed on a surface thereof juxtaposed against the solenoid a plurality of grooves each having a varying depth, an inner frame of the solenoid formed in positions corresponding with the grooves of the rotary disc with a plurality of grooves each having a varying depth, and a ball fitted in the grooves of the rotary disc and the grooves of the inner frame of the solenoid.

DETAILED DESCRIPTION

Figure 10:
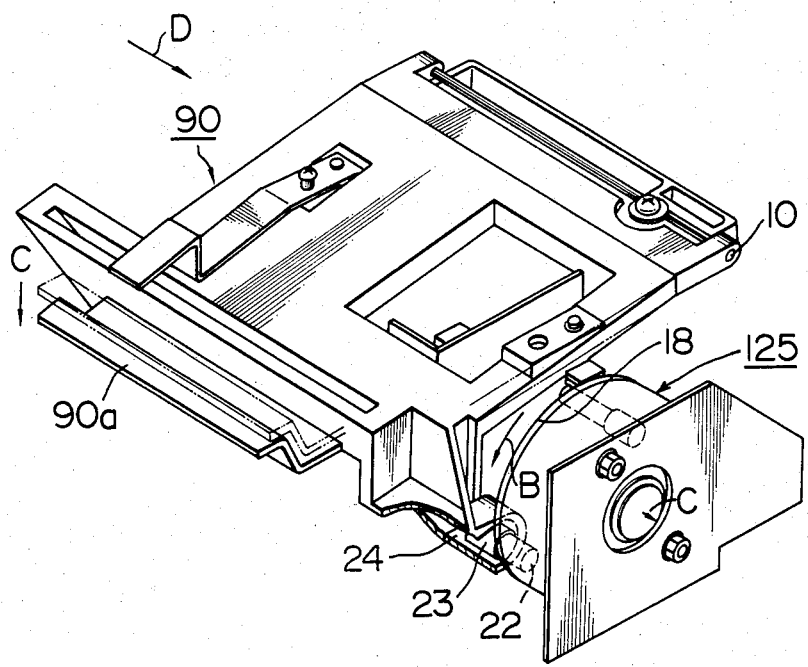
FIG. 10 is a prespective view of one embodiment of the head loading actuator of the magnetic head loading system in conformity with the invention.

FIG. 10 is a perspective view of the head loading actuator of the head loading system comprising a preferred embodiment of the invention. As shown, the head loading actuator comprises a bail 90 pivotable about the pin 10 which includes forward end portion 90a adapted to engage the hook 5 of the head support mechanism, a push-pull solneoid 125 including a plunger 130 which produces a linear motion for moving the plunger 130 in a straight line, and motion converting means for converting the linear motion of the plunger 130 into a rotary motion to move the forward end portion 90a of the bail 90 up and down. The motion converting means comprises a rotary member 18 for converting the linear motion of the plunger 130 into the rotary motion, and a pin 22 and a roller 23 for transmitting the rotary motion of the rotary member 18 to the bail 90, and is operative to move the forward end portion 90a of the bail 90 substantially vertically.

Figure 11:
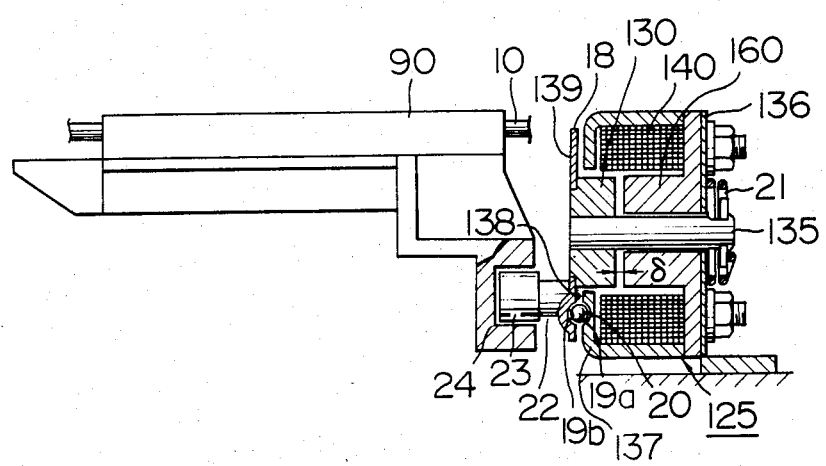
FIG. 11 is a side view of the head loading actuator shown in FIG. 10.

FIG. 11 shows one side of the head loading actuator shown in FIG. 10. The push-pull solenoid 125 comprises a fixed pole 160, a coil 140, the plunger 130, a guide shaft 135 mounted for rotation in a center hole of the fixed pole 160 for supporting the plunger 130, a coil spring 21 mounted between one end of the guide shaft 135 and a solenoid outer frame 136 for biasing the guide shaft 135 in a predetermined direction, and a frame 137 enclosing the coil 140 and formed at its front surface with guide grooves 19a subsequently to be described.

The rotary member 18 constituting a part of the motion converting means is mounted on the front surface of the plunger 130 to cooperate therewith and formed, at one portion of an inner surface 138, with grooves 19b of a shape subsequently to be described. The rotary member 18 has projecting form its outer surface the pin 22 having the roller 23 rotatably mounted at its forward end. The roller 23 is fitted in a bail groove 24 formed in a lower portion of the bail 90 for moving the bail 90 up and down as the rotary member 18 rotates.

A bearing 20 is mounted between the grooves 19b of the rotary member 18 and the guide grooves 19a of the frame 137. Upon the plunger 130 being attracted to the pole 160 following energization of solenoid 125, the bearing 20 moves along the grooves 19a and 19b in a manner to allow the plunger 130 to move rightwardly. Movement of the bearing 20 causes the rotary member 18 and the plunger 130 to rotate, as subsequently to be described.

Figure 12:
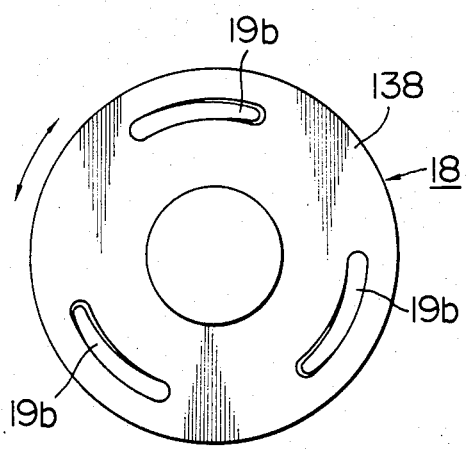
FIG. 12 shows the rotary disc of the head loading actuator shown in FIGS. 10 and 11.

FIG. 12 is a view showing the rotary member 18 as viewed from the direction of the inner surface 138. In this embodiment, the rotary member 18 is in the form of a disc and formed along its circumference with the three grooves 19b each of which is constructed such that its depth successively increases in going from one end of each groove toward the other end thereof as viewed from the side of the member 18.

Figure 13:
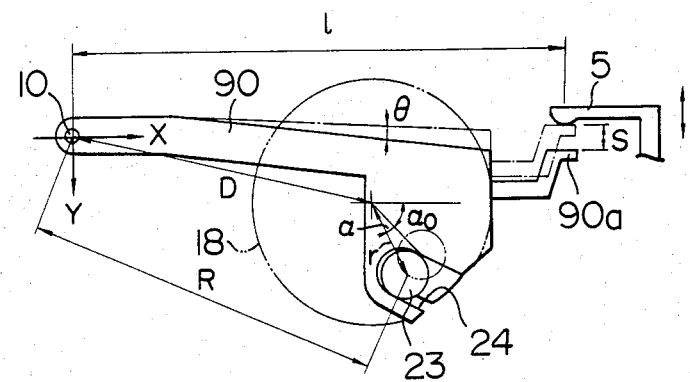
FIG. 13 is a view in explanation of the operation of the bail and the roller of the head load actuator shown in FIGS. 10 and 11.

FIG. 13 which shows the bail 90, as viewed in the direction of an arrow D in FIG. 10, is a view in explanation of the relationship between the movement of the roller 24 and the pivotal movement of the bail 90 about the pin 10 occasioned by the rotation of the rotary member 18 of the head loading actuator of the aforesaid construction. In FIG. 13, the roller 23 extending from the rotary member 18 is fitted in the bail groove 24 formed at the lower end of the bail 90. Thus as the roller 23 moves with the rotation of the rotary member 18, the bail 90 moves pivotally about the pin 10. At this time, the engaging portion 90a of the bail 90 would move in rotary motion, strictly speaking. However, it is spaced apart from the pin 10 serving as the pivot in this case by a distance l and has a very small stroke S. Thus, when the angle of pivotal movement of the bail 90 is denoted by $\theta$, the forward end portion 90a moves substantially in a linear motion.

For example, let the stroke of the forward end of the bail 90 necessary to accomplish the desired end, the distance from the center of the pin 10 to the forward end of the bail 90, the distance from the center of the pin 10 to the rolling center of the roller 23 in the bail groove 24, the angle of pivotal movement of the bail 90, the distance from the center of the pin 10 to the center of rotation of the rotary disc 18, the angle formed by a line parallel to the X axis of the Axes X and Y crossing perpendicular to each other at the pin 10 and a line extending through the center of the rotary disc 18 and the center of the pin 22, located at its home position the angle through which the rotary disc 18 further rotates from the aforesaid angle formed by the X axis with the centers of the rotary disc 18 and the pin 22, and the distance between the center of the rotary disc 18 and the center of the pin 22 be denoted by S, l, R, $\theta$, D, $\alpha_o$, $\alpha$, and $\gamma$, respectively. Then the angle of pivotal movement of the bail 90 and the lever ratio $\beta$ can be expressed by the following equations:

$$\theta = S/l \quad (9)$$

$$\beta = l/R \quad (10)$$

Furthermore, let the linear/rotary motion conversion constant decided by the angle of the grooves be denoted by $a_o$. Then the angle of rotation of the rotary disc 18 and the gap $\delta$ of the solenoid 125 can be expressed by the following equation:

$$\alpha = a_o \cdot \delta \quad (11)$$

Thus, the relation between the gap $\delta$ of the solenoid 125 and the stroke S can be expressed by the following equation (12):

$$S^x = l \cdot \theta = \beta \cdot R \cdot \theta = \beta \cdot R \cdot \frac{\gamma \cdot \alpha}{R} \quad (12)$$

$$= \beta \cdot \gamma \cdot a_o \cdot \delta$$

Since the lever ratio $\beta$, the distance $\gamma$ and the constant $a_o$ are decided by the structural dimensions, equation (12) shows that the necessary stroke S of the engaging portion 90a of the bail 90 and the gap $\delta$ of the solenoid 125 are proportional to each other using as a constant one of different types of variable values.

Figure 3:
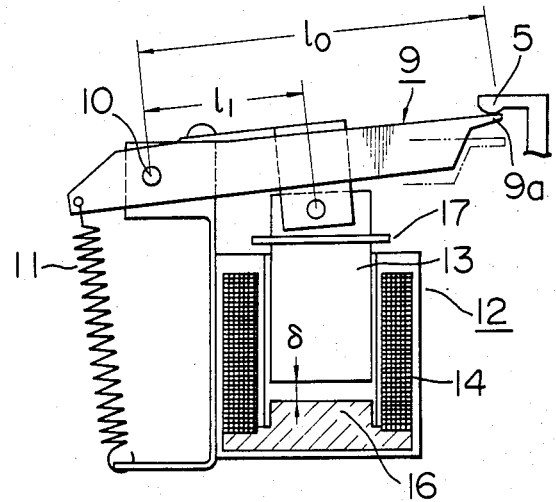
FIG. 3 is a sectional view of ahead loading actuator of a magnetic head loading system of the prior art.
Figure 4:
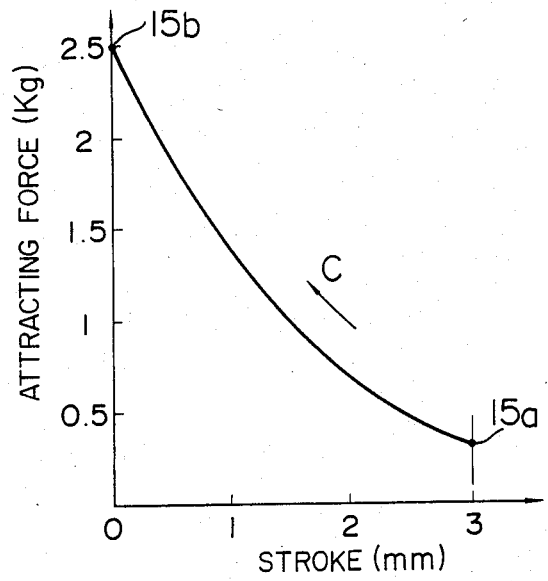
FIG. 4 is a digrammatic representation of the attracting force/stroke characteristic of the head loading actuator shown in FIG. 3.
Figure 5:
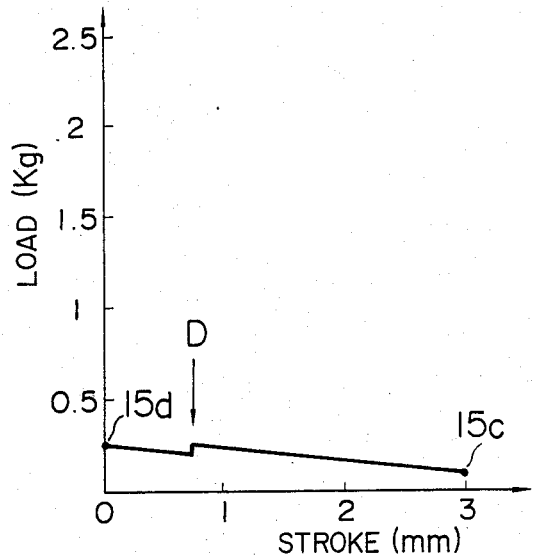
FIG. 5 is a diagrammatic representation of the load/stroke characteristic of the head loading actuator shown in FIG. 3.

For example, the stroke S' and the gap $\delta'$ of the head loading drive section shown in FIG. 3 are proportional to each other only using the lever ratio $\beta'$ as a constant as shown in the following equation (13):

$$S' = \beta' \cdot \delta' \tag{13}$$

In view of the limitations placed on the dimensions of the apparatus, it has been impossible to impart a sufficiently large value to the lever ratio $\beta'$ and, consequently, the head loading drive section of the prior art has hitherto been unable to give a sufficiently large value to the stroke S'. The lever ratio $\beta'$ is required to be based on a high dimensional accuracy because the distance covered by the movement of the plunger of the solenoid would be increased only by the lever ratio $\beta'$.

However, in the embodiment of the invention described hereinabove, the head loading actuator is able, as shown in FIG. 12, to impart a large value to the stroke S of the engaging portion 90a of the bail 90 even if the gap $\delta$ is small or the amount of movement of the plunger 130 is small, by increasing the constant $a_0$ which is decided by the angle of the grooves 19a and 19b, in the even that the distance $\gamma$ has a small value due to the need to reduce the thickness of the apparatus.

Considering a case in which the stroke S=S'=3 mm. In this case, the value of the gap $\delta$ is required to be 1.5 mm in the prior art because the lever ratio $\beta'=2$. In the embodiment described hereinabove, it will be seen that the gap $\delta$ can be reduced to about $\frac{1}{3}$ the value obtained in the prior art as indicated by the following equation, with the lever ratio $\beta'=1.2$, the distance $\gamma=13.5$ and the constant $a_0=0.37$ rad/mm:

$$\delta = \frac{3 \text{ mm}}{1.2 \times 13.5 \text{ mm} \times 0.37 \text{ rad/mm}} = 0.5 \text{ mm}$$

Thus, it will be appreciated that the push-pull solenoid 125 is able to operate in a position in which the attracting force undergoes little change with respect to the stroke.

Moreover, since the head loading actuator according to the invention is capable of operation in a positoin in which the attracting force of the push-pull solenoid 125 undergoes little change with respect to the stroke S of the plunger, it is possible to reduce the operation velocity of the bail 9 by taking the following measures:

According to Faraday's law, a voltage e generated at opposite ends of a winding is related to a change in time of a magnetic field H and the number of turns. The relation can be expressed by the following equation (14):

$$e = N \cdot \left( \frac{dH}{dt} \right) \tag{14}$$

By modifying equation (14) and performing bilateral integration, the following equation (15) can be obtained:

$$dH = -\frac{1}{N} e \cdot dt \tag{15}$$

$$= \frac{1}{N} \int e \cdot dt$$

Here, as shown by equation (3), the attracting force F of the push-pull solenoid 125 can be expressed by the following equation (16) by substituting equation (15) into equation (13):

$$F = \frac{1}{9.8} \mu_0 A H^2 \tag{16}$$

$$= \frac{1}{9.8} \mu_0 A \left( -\frac{1}{N} \int e \cdot dt \right)^2$$

Figure 7A:
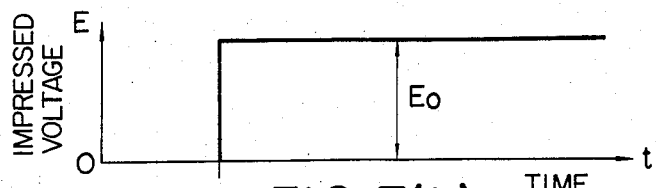
FIG. 7(a) and 7(b) are diagrammatic representations of the relationship between the voltage impressed on the head loading actuator shown in FIG. 3 and the electric current.
Figure 7B:
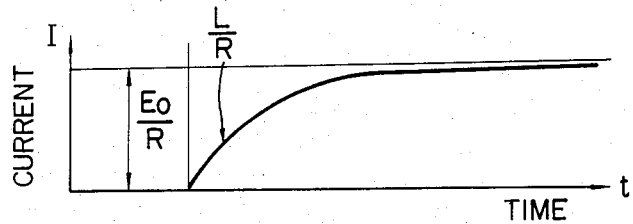
Figure 8:
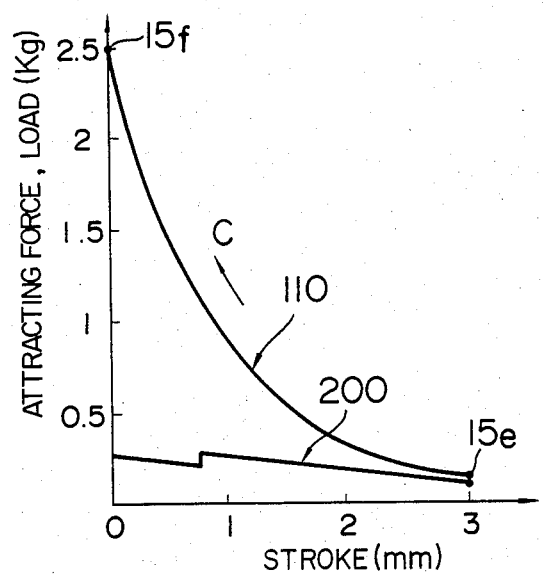
FIG. 8 is a diagrammatic representation of the attracting force and the load in relation to the stroke of a solenoid of the prior art determined by taking the impressed voltage into consideration.
Figure 9:
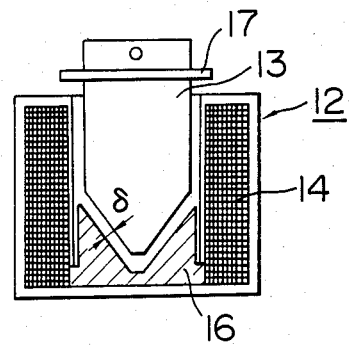
FIG. 9 shows a solenoid that has come to the mind of the inventor.

Equation (16) indicates the following:

(i) The attracting force increases with time integration of the impressed voltage. Thus, stepwise impression of a voltage would causes the attracting force to gradually increases with time as shown in FIG. 7a.

(ii) The change with time in attracting force, particularly its rise characteristic, could be varied by the number of turns N of the winding, thereby enabling rise to be achieved smoothly.

This would make it possible to design a magnetic head loading system in which the attracting force does not show an excessively large change with respect to a change in the gap $\delta$ of the push-pull solenoid or the stroke of the bail 90.

Figure 6:
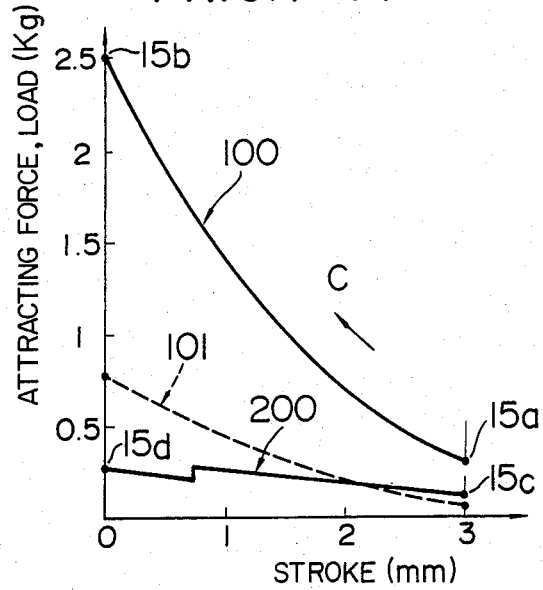
FIG. 6 is a diagrammatic representation of the attracting force and the load in relation to the stroke of the head loading acturator shown in FIG. 3.
Figure 14:
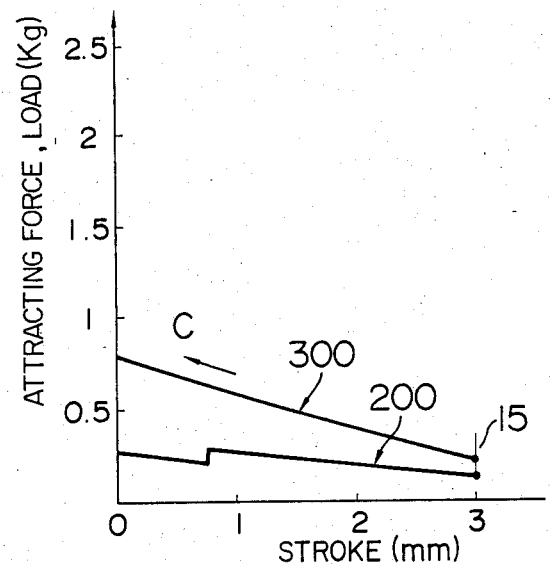
FIG. 14 is a diagrammatic representation of the attracting force and the load in relation to the stroke of the solenoid of the head loading actuator according to the invention.

FIG. 14 is a diagrammatic representation of the attracting force/load characteristic in relation to the stroke characteristic of the embodiment shown in FIG. 10. It will be seen that an attracting force curve 300 and a load curve 200 at the forward end of the bail in relation to the stroke characteristic indicate a marked improvement as compared with those shown in FIG. 6.

Operation of the head loading actuator of the magnetic head loading system shown in FIG. 10 of the aforesaid construction will be described.

In the head loading actuator shown in FIGS. 10 and 11, the coil spring 21 urges the guide shaft 135 to move leftwardly in the figure by its force of restitution when no energizing current is passed to the solenoid 125. The coil spring 21 is operative to unload the magnetic heads by pressing the plunger 130 when the energizing current is cut off. In this condition, a space $x_1$ is formed between the frame 137 of the plunger 125 and the inner surface 138 and the bearing 20 is positioned in the smaller depth portions of the grooves 19a and 19b.

Figure 15:
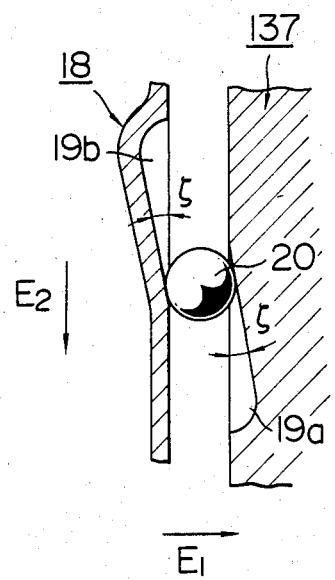
FIGS. 15 and 16 show the rotary disc and the inner frame of the motion converting portion of the head loading actuator according to the invention.

FIG. 15 shows, in a fragmentary sectional view, the rotary member 18 and the frame 137 as viewed longitudinally of the grooves 19a and 19b in the aforesaid condition. It will be clearly seen that the ball 20 is positioned in the small depth portions of the grooves 19a and 19b.

Figure 1A:
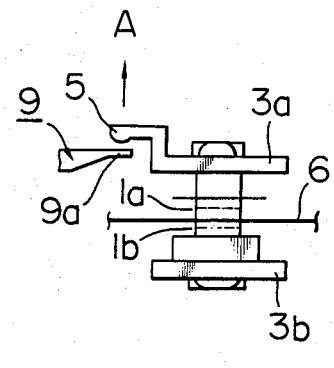
FIGS. 1(a) and 1(b) are respectively a front view and a side view of a magnetic head support mechanism of a magnetic head loading system of a prior art with the magnetic heads being moved toward the magnetic disc.
Figure 1B:
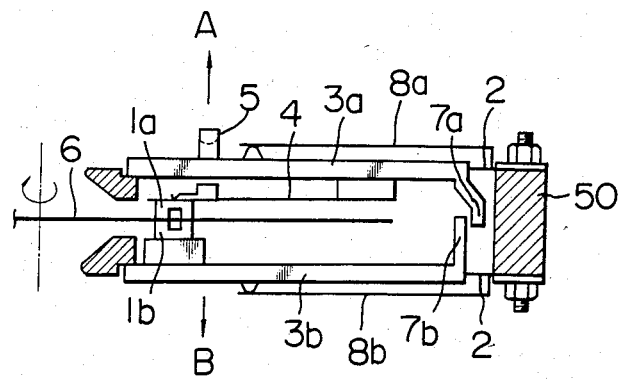
Figure 2A:
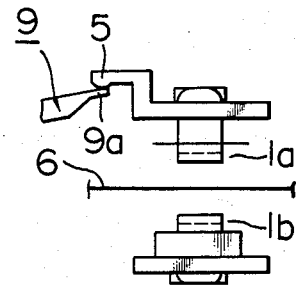
FIGS. 2(a) and 2(b) are respectively a front view and a side view of a magnetic head support mechanism of a magnetic head loading system of the prior art with the magnetic heads moving away from the magentic disc.
Figure 2B:
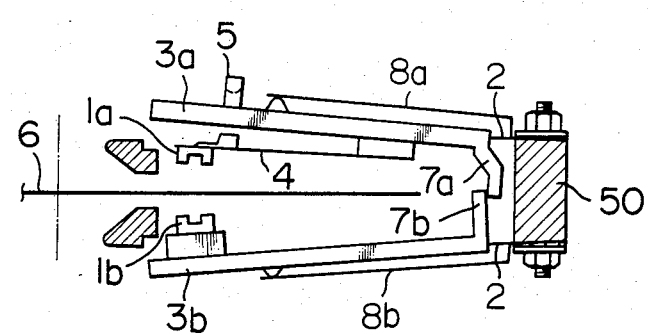
Figure 21:
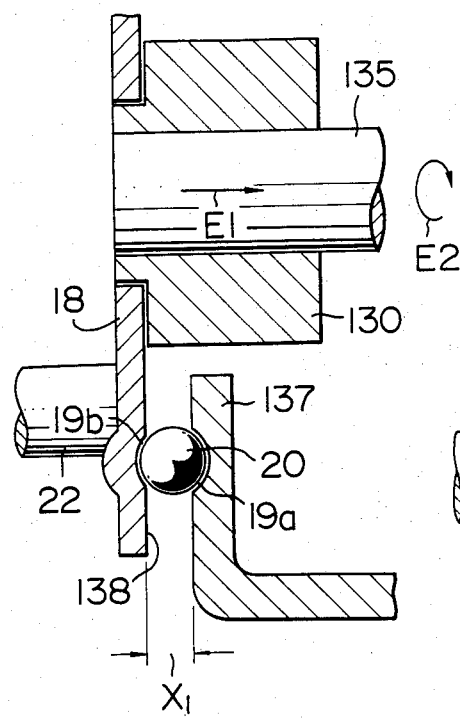
FIGS. 21 and 22 show the motion converting portion of the head loading actuator according to the invention for converting a linear motion of the solenoid into a rotary motion of the rotary disc.

At this time, the rotary disc 18 causes by its rotation the pin 22 to be disposed in a relatively high position as shown in FIG. 21. Thus, the roller 23 connected to the pin 22 pushes the forward end portion 90a of the bail 90 upwardly as shown in a broken line in FIG. 13, to thereby push upwardly the hook 5 of the magnetic head support mechanism. In this condition, the magnetic heads 1a and 1b are away from the magnetic disc 6 as shown in FIGS. 2(a) and 2(b).

When it is desired to move the magnetic heads toward the magnetic disc, a current is passed to the solenoid 125 of the head loading actuator to attract the plunger 130 supported by the guide shaft 135 to the fixed pole 160. The attracting force of the solenoid 125 tends to move the bearing 20 to large depth portions of the grooves 19a and 19b. This makes the rotary member 18 move in the direction of an arrow $E_1$ shown in FIG. 21 as the bearing 20 rotates, so that the rotary member 18 rotates in the direction of an arrow $E_2$ as the bearing 20 moves. In this fashion, the motion converting mechanism of the embodiment first converts a linear motion of the plunger 130 of the solenoid 125 into a rotary motion of the rotary disc 18.

Figure 16:
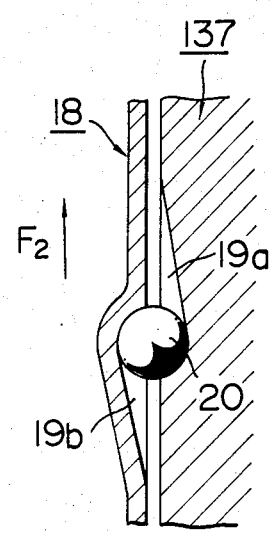
Figure 22:
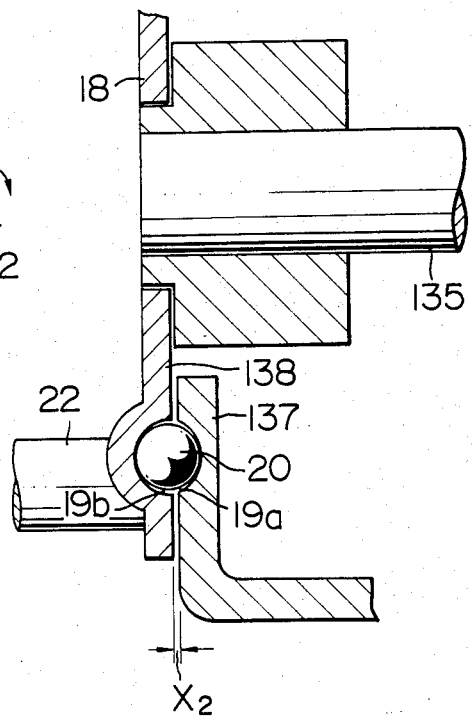

When the plunger 130 reaches its terminating position of its movement caused by the attracting force of the plunger 125, the bearing 20 is located in the maximum depth portions of the grooves 19a and 19b as shown in FIGS. 22 and 16. With the bearing 20 in this position, the rotary member 18 and the frame 137 are disposed close to each other with a spacing of $x_2$ therebetween. At this time, the pin is moved by the rotation of the rotary member 18 to its lowermost position, and causes the engaging portion 90a of the bail 90 to move downwardly to a position in which it is released from engagement with the hook 5, as shown in solid lines in FIG. 13.

Figure 18:
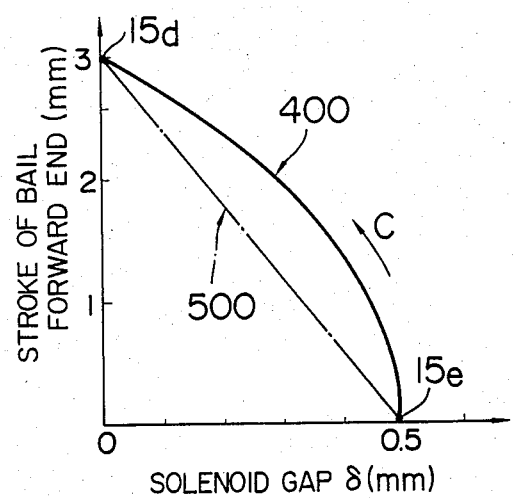
FIG. 18 is a diagrammatic representation of gap/stroke characteristic of the solenoid of the head loading actuator according to the invention.

The movement of the forward end portion 90a of the bail 90 when the magnetic heads 1a and 1b are moved toward the magnetic disc 6 will be described. FIG. 18 shows the relation between the stroke of the forward end portion 90a and the gap $\delta$ of the solenoid 125. As shown in the figure, the stroke of the forward end portion 90a of the bail 90 of the embodiment can vary linearly as indicated by a characteristic line 500 shown in a broken line from a starting point 15e at which the gap $\delta$ of the solenoid 125 is 0.5 mm to a terminating point 15d at which the gap $\delta$ is 0 mm. Thus, the head loading actuator of the embodiment enables the stroke of the forward end portion 90a of the bail 90 to be increased to 3 mm by using the stroke of 0.5 mm of the solenoid 125. This is supported by equation (14).

Figure 17:
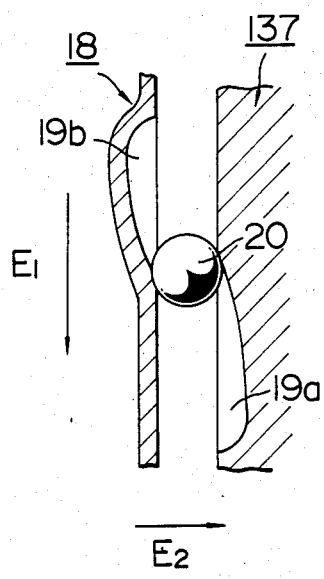
FIG. 17 shows a modification of the motion converting portion of the head loading actuator according to the invention.

In the head loading actuator according to the invention, the loading characteristic can be controlled by the configuration of the grooves 19a and 19b. For example, by imparting a smoothly curved surface to each of the grooves 19a and 19b as shown in FIG. 17, it is possible to cause the stroke of the forward end portion 90a of the bail 90 to vary in a curve as shown by a line 400 in FIG. 18. When this is the case, the head loading actuator can operate such that the movement of the magnetic heads can be slowed down as they draw near the magnetic head.

Figure 19:
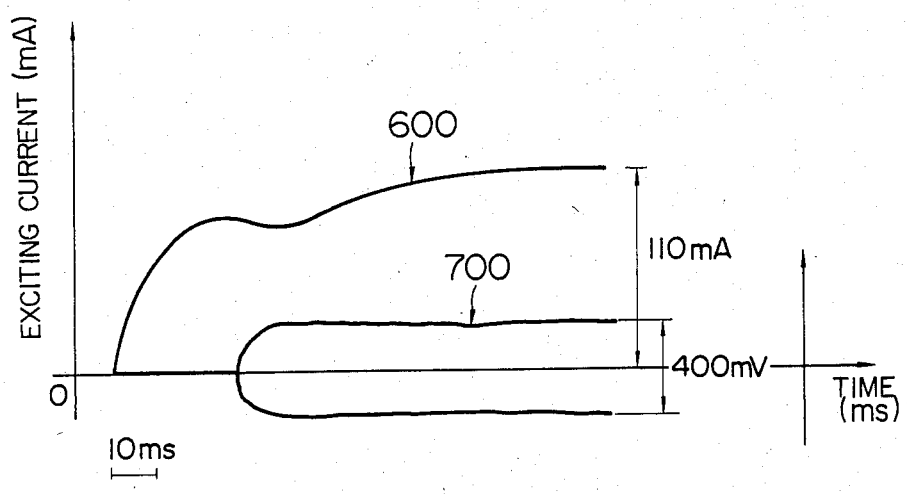
FIG. 19 is a view showing the relation between the energizing current to the solenoid of the head loading actuator according to the invention and the signal reproduced by the magnetic head.
Figure 20:
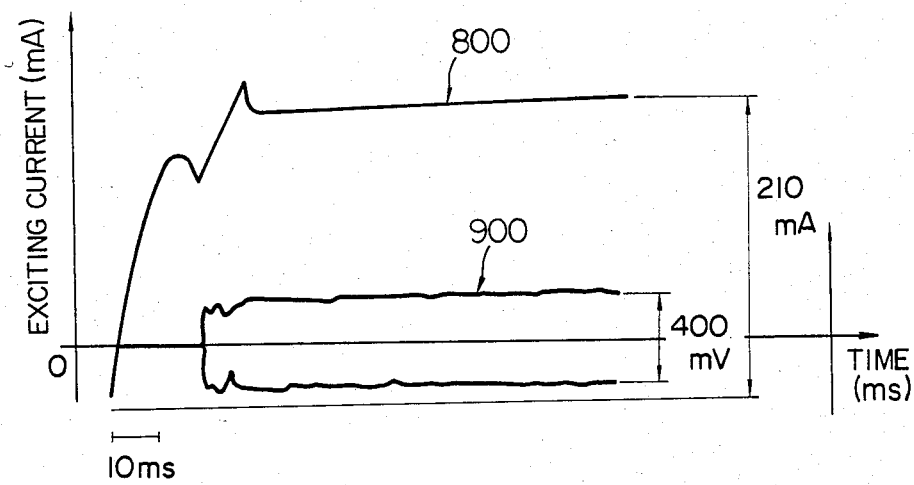
FIG. 20 is a view showing the relation between the energizing current of a solenoid of a head loading actuator of the prior art and the signal reproduced by the magnetic head.

FIG. 19 shows the results of experiments conducted on the change-with-time characteristic of an energizing current 600 of the solenoid 125 of the head loading actuator of the embodiment and a reproducing signal 700 of the magnetic heads detected in the loading process, and FIG. 20 shows the change-with-time characteristic of an energizing current 800 and a reproducing signal 900 of a head loading actuator of the prior art. It will be seen in FIGS. 19 and 20 that the head loading actuator according to the invention is capable of operation with the energizing current 600 of 110 mA which is about one half that of the energizing current 800 of the prior art shown in FIG. 20, and that the energizing current 600 and the reproducing signal 700 of the magnetic heads has a characteristic such that they successively increase with time, indicating that the magnetic heads can move toward the magnetic disc slowly.

The fact that the energizing current required by the head loading actuator according to the invention is small offers the advantages that the head loading actuator has a low electric power consumption level and generates little heat. The fact that the magnetic heads moves slowly toward the magnetic disc offers the advantages that damage that might otherwise be caused to the magnetic heads and magnetic disc as the former suddenly strike the latter with a high force and that the head loading system having the solenoid arranged horizontally can have its thickness reduced.

By virtue of the provision of the head loading actuator with means capable of rendering the motion conversion constant variable for effecting conversion of a motion from a linear motion of the solenoid first into a rotary motion and then into a linear motion again, such as the grooves formed at the rotary disc and the inner frame of the solenoid and the ball fitted in the grooves, the head loading system according to the invention can achieve the following effects:

(i) A short stroke of the solenoid can be converted into a long stroke of the hook of the head support mechanism.

(ii) The solenoid has a low electric power consumption level because head loading can be achieved with a short stroke of the solenoid.

(iii) The fact that the solenoid has a low electric power consumption level leads to a reduction in the amount of heat generated by the solenoid, thereby eliminating the risks of the recording medium expanding and contracting due to a change in temperature in the apparatus.

(iv) The magnetic heads can be made to move slowly toward the magnetic disc, thereby enabling damage that might otherwise be caused to the magnetic heads and magnetic disc by their collision to be eliminated.

(v) The vertical dimension of the magnetic disc apparatus with respect to the surfaces of the recording medium can be reduced, because the solenoid is arranged horizontally with respect to the surfaces of the recording medium and head loading is effected by converting a linear motion of the solenoid into a rotary motion.

What is claimed is:

1. A head loading system comprising:
   at least one head support mechanism supporting at least one head for at least reproducing information in juxtaposed relation to one surface of a recording medium; and
   a loading actuator for driving said head support to move said head toward and away from said one surface of said recording medium;
   said load actuator comprising:
   a solenoid including a plunger for moving the plunger in a linear motion in a direction substantially parallel to said one surface of said recording medium;
   motion converting means for converting the linear motion of said plunger of said solenoid into a rotary motion, said motion converting means having an axis of rotation parallel to the direction of movement of the linear motion; and
   a bail having opposite ends, said bail being driven at one of said opposite ends by the rotary motion of said motion converting means and pivotally supported only at the other end thereof about an axis substantially parallel to said one surface of said recording medium; and
   said support mechanism comprising a hook to be engaged by said one end of said bail.

2. A head loading system as claimed in claim 1, wherein said motion converting means is operative to convert a linear motion stroke of said plunger moving in linear motion in a straight line direction into a rotary motion stroke of the rotary motion to increase the rotary motion stroke as compared with the linear motion stroke.

3. A head loading system as claimed in claim 2, wherein said head support mechanism further comprises a first arm mounting said head and supporting said hook, pressure generating means generating a pressure for forcing said head mounted on said first arm to move toward said surface of said record medium, and resilient support means for resiliently supporting siad head for movement toward and away from said one surface of said recording medium.

4. A head loading system as claimed in claim 2, wherein said motion converting means comprises a rotary member supported by said plunger for rotation therewith, said rotary member being formed on a surface thereof juxtaposed against said solenoid a set of first grooves extending circumferentially of the rotary member and spaced equidistantly from the center of rotation of the rotary member, said set of first grooves each having a depth gradually increasing in the circumferential direction, a frame located in a space defined between said rotary member and said solenoid and formed on a surface thereof juxtaposed against said rotary member a set of second grooves in positions corresponding to the positions of said set of first grooves at said rotary member, said set of second grooves each having a depth gradually increasing in the circumferential direction, and a bearing fitted between said set of first grooves at said rotary member and said set of second grooves at said frame.

5. A head loading system as claimed in claim 4, wherein said rotary member has a pin and a roller, said pin being located in a position spaced apart from the center of rotation of said rotary member in a direction perpendicular to the direction of rotation of said rotary member and extending in a direction parallel to the center line of rotation of said rotary member, said roller being mounted at a forward end of said pin for rotation, and said bail being formed with a third groove having said roller fitted therein and including a bail forward end portion located in a position spaced apart from the position in which the bail is supported for pivotal movement a distance greater than the distance between the pivot of the bail and said third groove, said forward end portion of said bail being adapted to engage said hook of said head support mechanism.

6. A head loading system as claimed in claim 4, wherein said set of first grooves formed at said rotary member and said set of second grooves formed at said frame each have a bottom surface which is machined flat.

7. A head loading system as claimed in claim 4, wherein said set of first grooves formed at said rotary member and said set of second grooves formed at said frame each have a bottom surface which has a curvature.

8. A head loading system as claimed in claim 7, wherein said recording medium comprises a magnetic disc for magnetically recording information, and said head comprises a magnetic head for at least magnetically reproducing information magnetically recorded in said magnetic disc.

9. A head loading system comprising:
at least one head support mechanism supporting at least one head for at least reproducing information in juxtaposed relation to one surface of a recording medium; and
a loading actuator for driving said head support to move said head toward and away from said one surface of said recording medium;
said load actuator comprising:
a solenoid including a plunger for moving the plunger in a linear motion in a direction substantially parallel to said one surface of said recording medium;
motion converting means for converting the linear motion of said plunger of said solenoid into a rotary motion, said motion converting means having an axis of rotation parallel to the direction of movement of the linear motion, said motion converting means is operative to convert a linear motion stroke of said plunger moving in linear motion in a straight line direction into a rotary motion stroke of the rotary motion to increase the rotary motion stroke as compared with the linear motion stroke; and
a bail having opposite ends, said bail being driven at one of said opposite ends by the rotary motion of said motion converting means and pivotally supported at the other end about an axis substantially parallel to said one surface of said recording medium;
said support mechanism comprising a hook to be engaged by said one end of said bail; and
wherein said head support mechanism further comprises a first arm mounting said head serving as a first head, said first arm supporting a first cam extending toward said one surface of said recording medium and said hook adapted to engage said one end of said bail, pressure generating means generating a pressure for forcing said first arm in a direction in which said first head is moved toward said one surface of said recording medium, a second arm mounting a second head juxtaposed against another surface of said recording medium opposite said one surface against which aid one head is juxtaposed, said second arm supporting a second cam adapted to engage said first cam supported by first arm, and resilient support means for resiliently supporting said first arm and said second arm to move said first head and said second head toward and away from said surfaces of said recording medium.

10. A head loading system as claimed in claim 9, wherein said pressure generating means of said head support mechanism comprises a plate spring.

11. A head loading system as claimed in claim 9, wherein said pressure generating means and said resilient support means of said head support mechanism each comprise a plate spring.

* * * * *